(12) United States Patent
DeVries

(10) Patent No.: US 11,878,874 B2
(45) Date of Patent: Jan. 23, 2024

(54) GUIDED CARTRIDGE BELT CLEANER

(71) Applicant: Flexible Steel Lacing Company, Downers Grove, IL (US)

(72) Inventor: Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 17/748,872

(22) Filed: May 19, 2022

(65) Prior Publication Data

US 2022/0371829 A1 Nov. 24, 2022

Related U.S. Application Data

(60) Provisional application No. 63/190,590, filed on May 19, 2021.

(51) Int. Cl.
*B65G 45/14* (2006.01)
*B65G 45/12* (2006.01)
*B65G 45/16* (2006.01)
*B65G 45/06* (2006.01)

(52) U.S. Cl.
CPC ............. *B65G 45/14* (2013.01); *B65G 45/12* (2013.01); *B65G 45/06* (2013.01)

(58) Field of Classification Search
CPC ......... B65G 45/12; B65G 45/14; B65G 45/16
See application file for complete search history.

(56) References Cited

U.S. PATENT DOCUMENTS

| | | |
|---|---|---|
| 3,631,968 A | 1/1972 | Ward |
| 3,656,610 A | 4/1972 | McWilliams |
| 3,841,469 A | 10/1974 | Scott |
| 3,875,613 A | 4/1975 | Pincus |
| 4,053,045 A | 10/1977 | Reiter |
| 4,182,444 A | 1/1980 | Fisher |
| 4,249,650 A | 2/1981 | Stahura |
| 4,529,084 A | 7/1985 | Zhang |
| 4,533,035 A | 8/1985 | Reiter |

(Continued)

FOREIGN PATENT DOCUMENTS

| | | |
|---|---|---|
| DE | 2942268 | 2/1981 |
| JP | S4734980 U | 10/1972 |

(Continued)

OTHER PUBLICATIONS

Martin Orion Belt Cleaning Systems—Orion-2000 Secondary Cleaner. Form No. L3709-06/08 (2005, 2008) (2 pages).

(Continued)

*Primary Examiner* — Mark A Deuble
(74) *Attorney, Agent, or Firm* — Fitch, Even, Tabin & Flannery LLP

(57) ABSTRACT

A belt cleaner assembly is provided for cleaning a conveyor belt. The belt cleaner assembly includes an elongate support member for extending longitudinally across a conveyor belt. The belt cleaner assembly further includes a cartridge for supporting at least one scraper blade thereon. The cartridge is slidable over the support member. The belt cleaner assembly further includes slide blocks between the support member and the cartridge to space facing surfaces of the cartridge and the support member from each other.

25 Claims, 12 Drawing Sheets

(56) References Cited

U.S. PATENT DOCUMENTS

| | | |
|---|---|---|
| 4,533,037 A | 8/1985 | Kerr |
| 4,586,600 A | 5/1986 | Lindbeck |
| 4,620,627 A | 11/1986 | Griffiths |
| 4,696,389 A | 9/1987 | Schwarze |
| 4,825,996 A | 5/1989 | Davidts |
| 4,836,356 A | 6/1989 | Mukai |
| 4,915,211 A | 4/1990 | Dohmeier |
| 4,953,689 A * | 9/1990 | Peterson ............... B65G 45/16 15/256.51 |
| 5,247,778 A | 9/1993 | Tisma |
| 5,727,670 A | 3/1998 | Johnson |
| 6,056,112 A | 5/2000 | Wiggins |
| 6,315,105 B1 | 11/2001 | Gibbs et al. |
| 6,321,901 B1 | 11/2001 | Strebel et al. |
| 6,581,754 B2 * | 6/2003 | Law ...................... B65G 45/12 15/256.51 |
| 6,823,983 B2 | 11/2004 | DeVries |
| 6,860,378 B1 | 3/2005 | Johannsen |
| 6,874,616 B2 | 4/2005 | DeVries et al. |
| 6,929,112 B2 | 8/2005 | Hall |
| 6,991,088 B1 | 1/2006 | Smith |
| 7,007,794 B2 | 3/2006 | Waters et al. |
| 7,093,706 B2 * | 8/2006 | DeVries ............... B65G 45/16 198/497 |
| 7,216,756 B2 | 5/2007 | Swinderman |
| 7,308,980 B2 | 12/2007 | Peterson et al. |
| 7,367,443 B2 | 5/2008 | Swinderman |
| 7,370,750 B2 | 5/2008 | Swinderman |
| 7,740,127 B2 | 6/2010 | Swinderman et al. |
| 7,987,966 B2 * | 8/2011 | DeVries ............... B65G 45/16 198/497 |
| 8,205,741 B2 | 6/2012 | Swinderman |
| 8,245,836 B2 | 8/2012 | Kotze |
| 8,312,986 B2 | 11/2012 | Devries et al. |
| 8,393,459 B2 | 3/2013 | Childs |
| 8,485,344 B1 | 7/2013 | Liland |
| 8,640,856 B2 | 2/2014 | Devries et al. |
| 8,757,360 B2 * | 6/2014 | Kuiper .................. B65G 45/12 198/497 |
| 9,085,419 B2 | 7/2015 | Kuiper et al. |
| 9,090,405 B2 * | 7/2015 | DeVries ............... B65G 45/16 |
| 9,169,081 B1 * | 10/2015 | Harrison ............... B65G 45/16 |
| 9,376,264 B1 | 6/2016 | Foley |
| 10,836,585 B2 | 11/2020 | Devries |
| 2002/0079196 A1 | 6/2002 | Law |
| 2005/0121294 A1 | 6/2005 | Finger |
| 2006/0131136 A1 | 6/2006 | Smith et al. |
| 2008/0023298 A1 | 1/2008 | Davidts |
| 2008/0251358 A1 | 10/2008 | Thew |
| 2009/0173599 A1 | 7/2009 | Khanania |
| 2010/0000842 A1 | 1/2010 | Devries et al. |
| 2011/0192705 A1 | 8/2011 | Kotze |
| 2012/0305367 A1 | 12/2012 | Wilfried |
| 2013/0026008 A1 | 1/2013 | Childs |
| 2014/0238822 A1 | 8/2014 | Smith |
| 2019/0248598 A1 | 8/2019 | Fransson |
| 2022/0396432 A1 * | 12/2022 | Snow .................... B65G 45/16 |

FOREIGN PATENT DOCUMENTS

| | | |
|---|---|---|
| JP | S5978318 U | 5/1984 |
| JP | H0581125 U | 11/1993 |

OTHER PUBLICATIONS

Martin Orion Belt Cleaning System—Belt Cleaners, Form No. L3719-07/08 (2005, 2008) (2 pages).

Martin Orion Belt Cleaning System—Orion-2000 and H20-4000 Belt Cleaners Operator's Manual M3702 (2005, 2009) (42 pages).

Invitation to Pay Additional Fees and, Where Applicable, Protest Fee issued in International Patent Application No. PCT/US22/30108 dated Aug. 1, 2022.

Machine English translation of webpage showing Martin Engineering In Line XHD Primary Scraper, believed to be publically available at least as early as Dec. 18, 2018: https://www.martin-eng.com.br/content/product/4011/raspador-primario-inline-xhd.

Notification of Transmittal of the International Search Report and the Written Opinion of the International Searching Authority, or the Declaration from the International Bureau of WIPO for related International Application No. PCT/US22/30108, dated Sep. 23, 2022, 10 pages.

* cited by examiner

GUIDED CARTRIDGE BELT CLEANER

CROSS-REFERENCE TO RELATED APPLICATION

This application claims the benefit of U.S. Provisional Patent Application No. 63/190,590, filed May 19, 2021, entitled GUIDED CARTRIDGE BELT CLEANER, which is hereby incorporated by reference in its entirety.

FIELD OF THE INVENTION

This disclosure relates to cleaners for conveyor belts, and more particularly, to cleaner cartridges that can be easily installed under a conveyor belt and removed therefrom.

BACKGROUND OF THE INVENTION

Conveyor belt systems may be used to transport conveyed materials such as coal or aggregate from one location to another and include various components, such as conveyor belts, chutes, and rollers. Material not discharged by the conveyor belt may remain on the conveyor belt along the return side of the belt. Such carryback of material is typically undesirable, often necessitating additional site maintenance and potentially causing problems with the conveyor system. As such, conveyor belt cleaners are often utilized to remove residual material from the conveyor belt.

A conveyor belt cleaner may include one or more scraper blades operatively mounted to an elongated support member, such as a support shaft, that extends laterally across the belt with the scraper blades biased into engagement with the surface of the conveyor belt. The scraper blades scrape away residual material as the conveyor belt moves past the belt cleaner. Example conveyor belt cleaning assemblies are described in U.S. Pat. No. 6,874,616, entitled "Conveyor Belt Cleaning System," U.S. Pat. No. 6,823,983, entitled "Conveyor Belt Cleaner," and in U.S. Pat. No. 7,987,966, entitled "Removable Cartridge Cleaner," each of which is hereby incorporated by reference as if fully set forth herein.

Conveyor belt cleaning assemblies often need to be disassembled during the life of the cleaning assemblies. For example, scraper blades may require maintenance or may need to be replaced due to wear or change in desired use of the conveyor belt. In some instances, such disassembly can require an operator to release and remove a cartridge to which the scraper blades are mounted from the support shaft on which the cartridge is installed.

Installation and removal of a cartridge may include sliding the cartridge along a support shaft to a fully engaged or fully disengaged position, respectively. Cartridges often have a length that generally corresponds to the width of the conveyor belt. Cartridges of relatively longer lengths, e.g., 48 inches or longer, can be heavy and difficult to move.

In many instances, the cartridge and support shaft are each made of metal. For example, U.S. Pat. No. 6,581,754 discloses a metal cartridge that is slidably mounted to a metal cross shaft. The sliding of a metal cartridge such as disclosed in the '754 patent along a metal support shaft during installation and removal of the cartridge can create relatively high metal-on-metal friction forces, with inner facing contact surfaces of the respective walls of the metal cartridge and the metal cross shaft having a close sliding fit with each other along substantially the entire length of the cross shaft. The large surface area over which there is metal-to-metal contact creates a high friction interface between the two metal structures which can increase the difficulty of sliding the cartridge, particularly with a longer and heavier cartridge.

DETAILED DESCRIPTION

Figure 1:
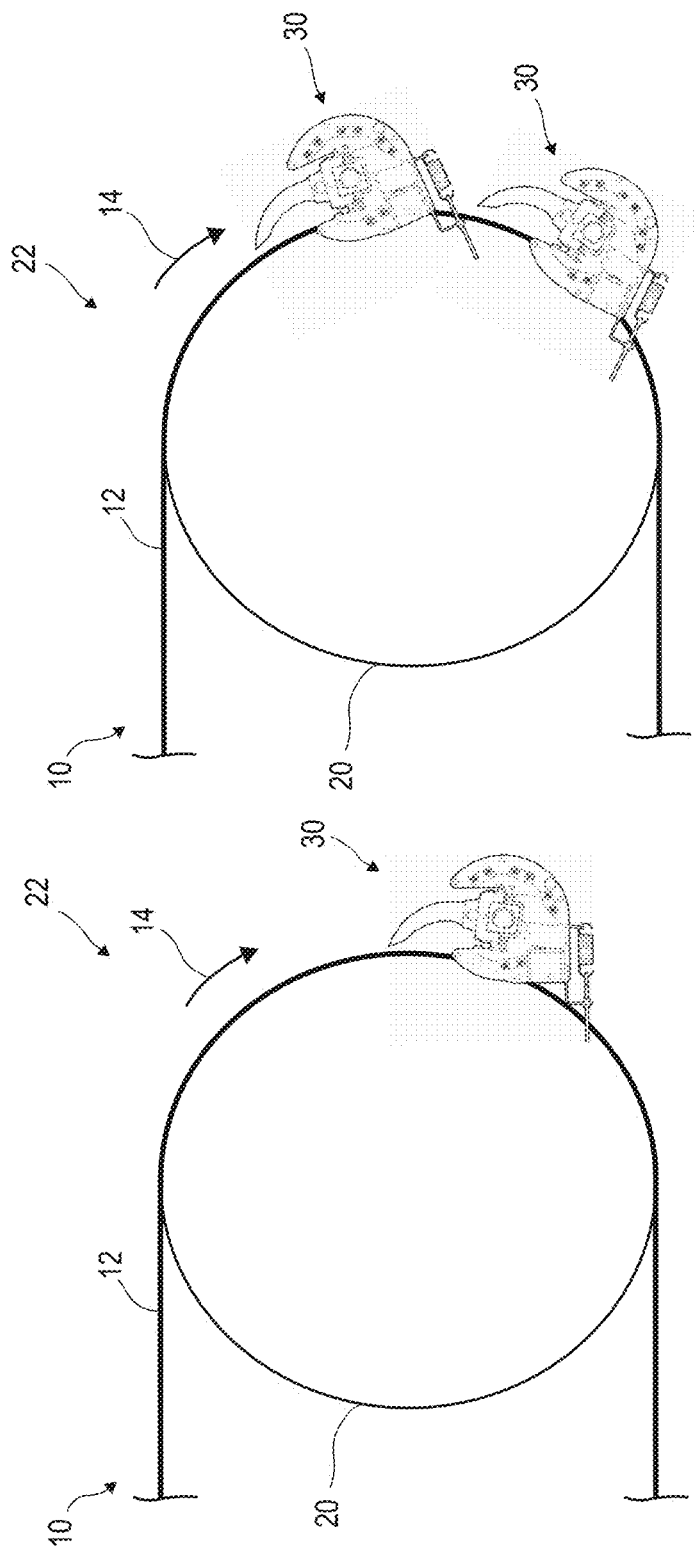
FIG. 1A is a schematic view of a portion of a conveyor system showing a conveyor belt passing over a pulley and a cleaning assembly adjacent the conveyor belt with scraper blades biased out of engagement with the conveyor belt.
FIG. 1B is a schematic view of the portion of the conveyor system of FIG. 1A showing two cleaning assemblies spaced along the circumference of the pulley adjacent the conveyor belt.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In one form, described herein is cleaning assembly that includes a support assembly and a cartridge slidable relative to the support assembly. The support assembly includes slide blocks secured to a support shaft. The slide blocks are formed of a low friction material such as a plastic. During installation and removal of a cartridges, the metal support structure of the cartridge slides over the low friction slide blocks and does not contact the metal support shaft. In this way, the slide blocks provide a reduced-friction interface between the support assembly and the cartridge as the cartridge is slid across the support assembly.

The slide blocks are spaced apart such that they run along less than the entire outer surface of the support shaft. Because the cartridge engages only the slide bocks and not the support shaft, the contact surface area between the cartridge and the support assembly is greatly reduced, further facilitating sliding of the cartridge across the support assembly. In a preferred form, the slide blocks are of a low friction plastic material, and the cartridge and the support shaft of metal material so that the slide blocks eliminate high friction metal-to-metal sliding contact between the cartridge and the support shaft.

The slide blocks further facilitate disposal of debris and other material that may accumulate on the support assembly. Debris may accumulate on the slide blocks, for example, when the conveyor belt is run without a cartridge installed on the support assembly. During installation of a cartridge, the cartridge slides along the slide blocks and pushes debris off of the slide blocks and into gaps between the slide blocks. As the cartridge does not have a bottom portion that extends below the support shaft, this pushed material may freely fall between side slide blocks to a floor surface below the cleaning assembly.

The cartridges include retention rails secured to the cartridges. The retention rails of the cartridges are received in the clearance space between the cartridge and the support shaft immediately adjacent to and spaced from slide blocks of the support assembly. More specifically, the retention rails are in side portions of the clearance space and cooperate with the adjacent side slide blocks of the support assembly to maintain the cartridges on the support assembly in directions transverse to the axial sliding thereof during installation and removal of the cartridges. For example, if a cartridge were to experience forces wanting to cause rotation about a longitudinal sliding axis of the cartridge, the retention rails engage the side slide blocks to inhibit further tipping of the cartridge. In this way, the retention rails oppose undesired dislodgment of the cartridges during installation and removal of the cartridges.

Referring now to FIGS. 1A and 1B, a conveyor belt system 10 includes a conveyor belt 12 in the form of a continuous belt. The conveyor belt 12 travels along a path 14 over a rotatable pulley 20 at an end portion 22 of the conveyor belt system 10. The pulley 20 may be a head pulley that is connected to a power source such as a motor that drives the pulley 20, which in turn acts upon the conveyor belt 12 and can cause the conveyor belt 12 to discharge carried material at the pulley 20.

The conveyor belt system 10 includes one or more belt cleaners positioned to engage the conveyor belt 12 so as to remove material from the conveyor belt 12 as the belt moves along the path 14. The belt cleaners may include one or more pre-cleaner or primary belt cleaners 30 positioned at the pulley 20 to assist in discharging material from the conveyor belt 12. For example, FIG. 1A shows a single belt cleaner 30 disposed adjacent the pulley 20, and FIG. 1B shows two belt cleaners 30 spaced along the circumference of the pulley 20 adjacent the conveyor belt 12. The use of more than one primary belt cleaner 30 at the pulley 20 may reduce the amount of carryback material carried along the return run of the conveyor belt 12. As discussed in greater detail below, the conveyor belt system 10 may also or instead include one or more secondary belt cleaners positioned along the return run of the conveyor belt 12 to provide additional cleaning of the conveyor belt 12.

Figure 2:
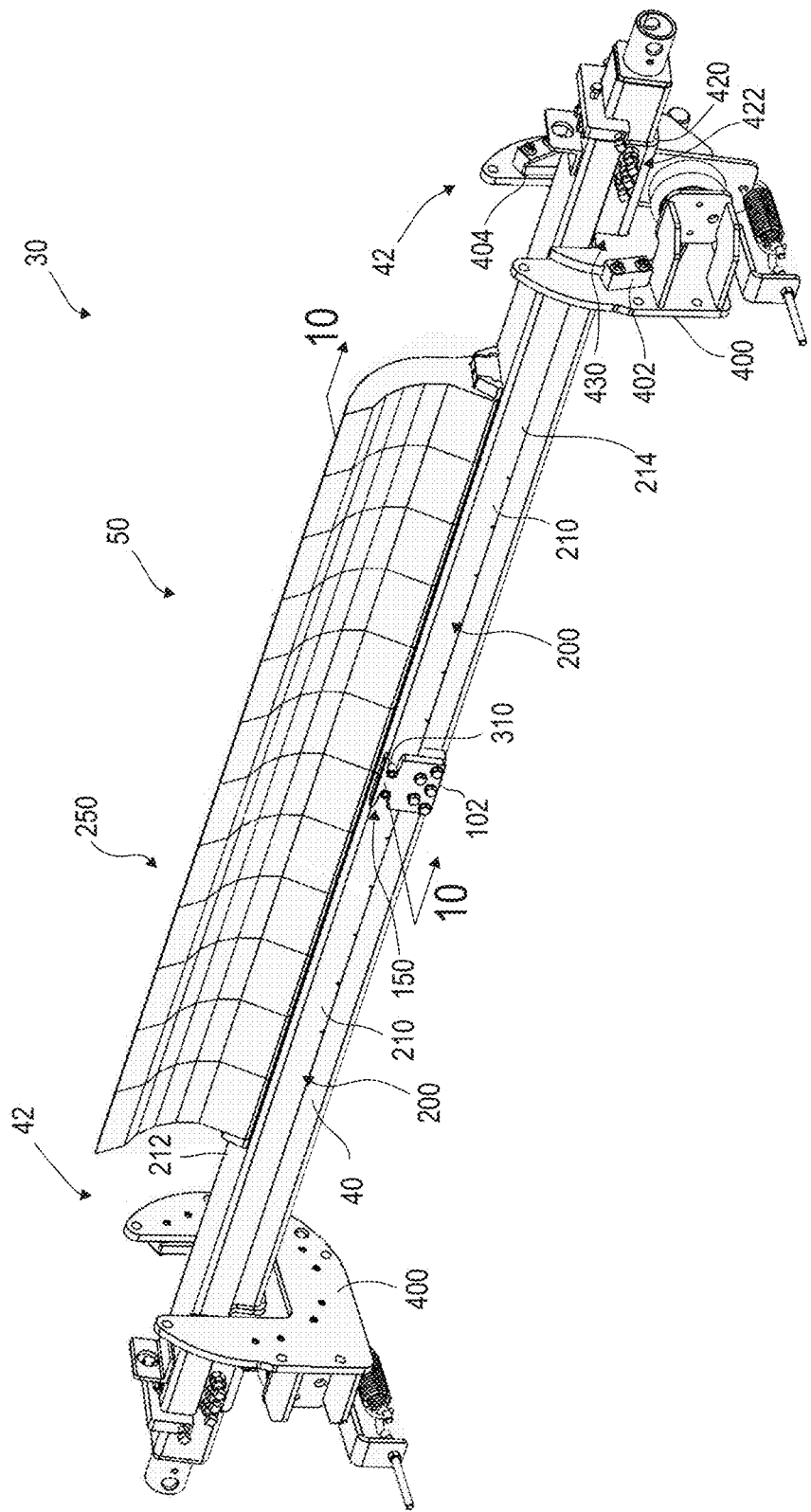
FIG. 2 is a perspective view of the cleaning assembly showing a cartridge carrying scraper blades and secured to a support shaft in the operative position of the cartridge with the support shaft mounted at either end thereof to tensioners.
Figure 3:
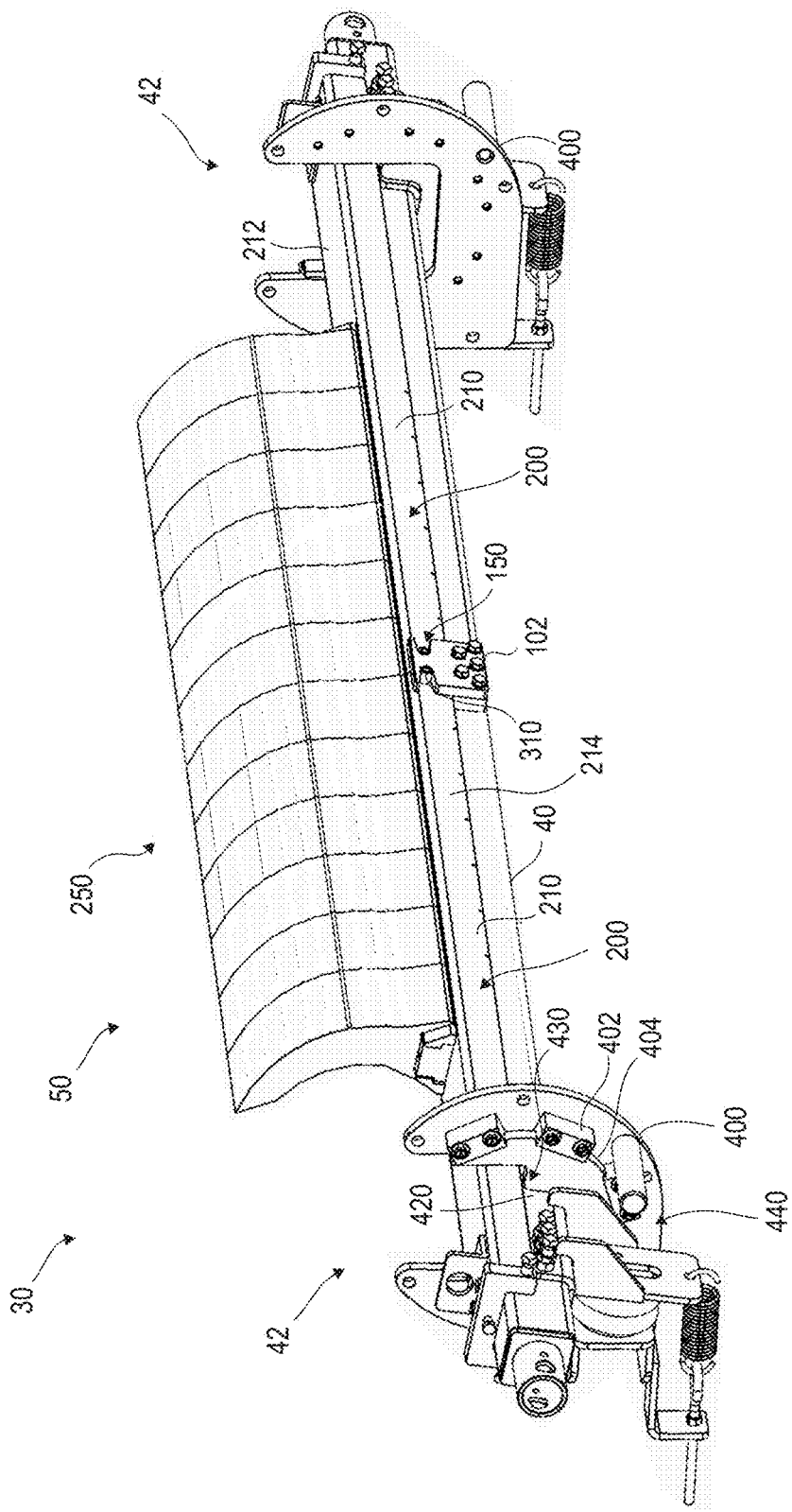
FIG. 3 is a perspective view of the cleaning assembly showing the curvature of the scraping blades.

Referring to FIGS. 2 and 3, an example of a belt cleaner 30 is provided. The belt cleaner 30 may be a primary cleaner positioned adjacent a head pulley, as shown in FIGS. 1A and 1B. The belt cleaner 30 includes an elongate support member such as support shaft 40 that extends between opposing tensioners 42, and a scraper assembly 50 that is supported by the support shaft 40. As discussed in greater detail below, the tensioners 42 operate to both support and rotate the support shaft 40 and the scraper assembly 50.

The scraper assembly 50 is preferably sized to include two cartridges 200 for being installed on the support shaft 40 from either end thereof. The cartridges 200 may be mirror images of each other with substantially the same features. Each cartridge 200 includes a unitary scraper blade carrier member such as a support rail 210 having a generally inverted U-shaped configuration that is modified to have a flattened base instead of a curved bottom. Scraper blades 250 are secured to a flat upper web or wall 212 of the support rail 210.

The support rails 210 further include flat side legs 214 that depend or extend vertically downwardly from the upper wall 212 along the length thereof. The side legs 214 are generally symmetrically spaced from a center of the upper wall 212. The upper wall 212 and side legs 214 cooperate to form an elongate channel 216 (see FIG. 4) therebetween for receiving a portion of the support shaft 40 therebetween so that the side legs 214 extend down alongside the support shaft 40 when in the operative installed position thereon to retain the support rails 210 on the support shaft 40, as discussed in greater detail below. The side legs 214 depend vertically downwardly along less than an entire height of the support shaft 40 to a bottom end 214B that is above a bottom end 40C of the support shaft 40, and are spaced from a sidewall 72A of the support shaft 40. In this way, and as discussed below, debris that may accumulate between the support rail 210 and the support shaft 40 may fall freely between the side legs 214 and the support shaft 40.

Figure 4:
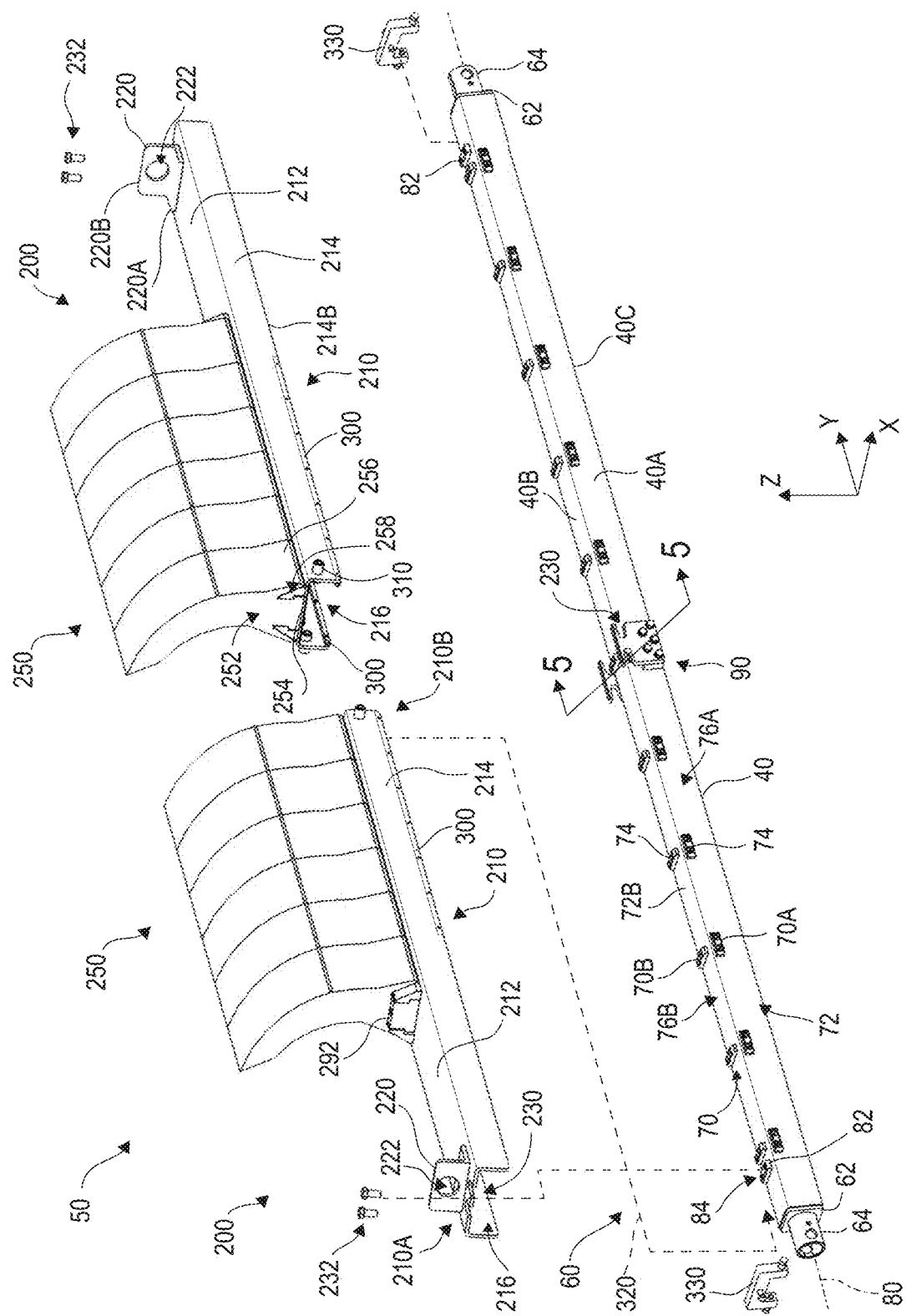
FIG. 4 is an exploded, perspective view of the cartridge and a support assembly showing a main elongate shaft portion of the support assembly having a square cross-sectional configuration and a blade carrying member of the cartridge having an inverted generally U-shaped configuration.

Referring to FIG. 4, a support assembly 60 of the belt cleaner 30 is shown with the scraper assembly 50 removed from the support assembly 60. The support assembly 60 includes the support shaft 40, which has a main elongate shaft portion having a cross-section that preferably is generally rectangular (e.g., square) so as to have flat walls and corresponding surfaces thereof extending thereabout.

A cap plate 62 and a stub shaft 64 may be secured at ends of the support shaft 40; for example, for mounting of accessories thereto. For example, monitoring devices such as a sensor disclosed in U.S. Pat. No. 10,836,585, which is hereby incorporated by reference as if fully set forth herein, may be mounted to the stub shaft 64.

As shown in FIG. 4, the support assembly 60 includes at least one slide block 70 secured to an outward facing surface of a side wall 72 of the main shaft portion of the support shaft 40. For example, the support assembly 60 may include one or more guide members or side slide blocks 70A secured to opposite outer surfaces of lateral side walls 72A of the main portion of the support shaft 40. As shown, the side slide blocks 70A space the side legs 214 of the support rail 210 of the cartridge 200 from the outer side walls of surfaces 40A the support shaft 40 and guide sliding of the side legs 214 along the support shaft 40 during installation of the cartridge 200 on the support shaft 40. Additionally or alternatively, the support assembly 60 includes one or more upper slide blocks 70B secured to the outer surface of the upper wall 72B of the main portion of the support shaft 40. The upper slide blocks 70B space the upper wall 212 of the support rail 210 of the cartridge 200 from the upper wall or surface 40B of the support shaft 40 and support the weight of the cartridge 200 on the support shaft 40.

The slide blocks 70 are formed of a low friction material to facilitate sliding of a cartridge 200 of the scraper assembly 50 relative to the support shaft 40 during installation and removal of the cartridge 200 (discussed in greater detail below). The slide blocks 70 are generally non-corrosive and may be formed, for example, of a low friction polymer such as ultra-high molecular weight polyethylene. The slide blocks 70 may be formed other low friction polymers such as oil-filled nylon, graphite-filled nylon, or MoS2-filled nylon. The slide blocks 70 may also be formed of low friction metals such as oil-filled bronze.

The slide blocks 70 are axially or longitudinally spaced apart along a central longitudinal axis 80 of the support shaft 40 such that longitudinal gaps 76A, 76B are formed between individual adjacent slide blocks 70A, 70B. The gaps 76A, 76B provide a clearance between the slide blocks 70A, 70B into or through which debris may be pushed. For example, during installation of a cartridge 200, the cartridge 200 slides along the slide blocks 70A, 70B and pushes debris off of the slide blocks 70A, 70B. As the cartridge 200 forms a generally inverted U-shaped configuration that does not have a bottom portion extending below the support shaft 40, debris that is pushed off the side slide blocks 70A freely falls through the gaps 76A between side slide blocks 70A and down to a floor surface below the belt cleaner 30. Debris pushed off the upper slide blocks 70B is pushed into gaps 76B between the upper slide blocks 70B, and may continue to fall through gaps 76A between side slide blocks 70A to the floor surface.

The slide blocks 70 are generally rectangular in shape. For example, the slide blocks 70 may have dimensions of approximately 68 millimeters in the Y direction, approximately 20 millimeters in the Z direction, and approximately 14 millimeters in the X direction. In the approach shown in FIG. 4, the side slide blocks 70A are oriented to have long axes parallel to the central axis 80, and the upper slide blocks 70B are oriented to have long axes orthogonal to the central axis 80. Alternatively, either or both of the side and upper slide blocks 70A, 70B may have orientations rotated 90 degrees or other suitable degree of rotation from the orientations shown. In still other approaches, either or both of the side and upper slide blocks 70A, 70B may include individual elongate sides blocks that extend continuously along half of the length of the support shaft 40, or along the entire length of the support shaft 40.

The slide blocks 70 are removably secured to the support shaft 40. For example, the slide blocks 70 may be mechanically secured to the faces 72 of the support shaft 40 with one or more fasteners 74. In this way, the slide blocks 70 may be removed and replaced as desired. Removing a slide block allows an operator to clean the slide block 70 and/or the support shaft 40, or replace the slide block 70. A slide block 70 may be replaced, for example, when the slide block 70 is worn or damaged, or when a different type of slide block (e.g., having different dimensions or material properties) is desired.

The support assembly 60 includes cartridge end mount blocks 82 secured at opposing end regions of the support shaft 40. The cartridge end mount blocks 82 can be fixed to the upper wall 72B of the support shaft 40, such as by welding, and can include threaded openings 84 to receive threaded fasteners such as bolts 232 that secure outer end portion 210A of the cartridge 200 to the support shaft 40, as discussed in greater detail below. The support assembly 60 further includes central retention assemblies 90 that are secured to side walls 72A of the support shaft 40 centrally along the length of the support shaft 40.

Figure 5:
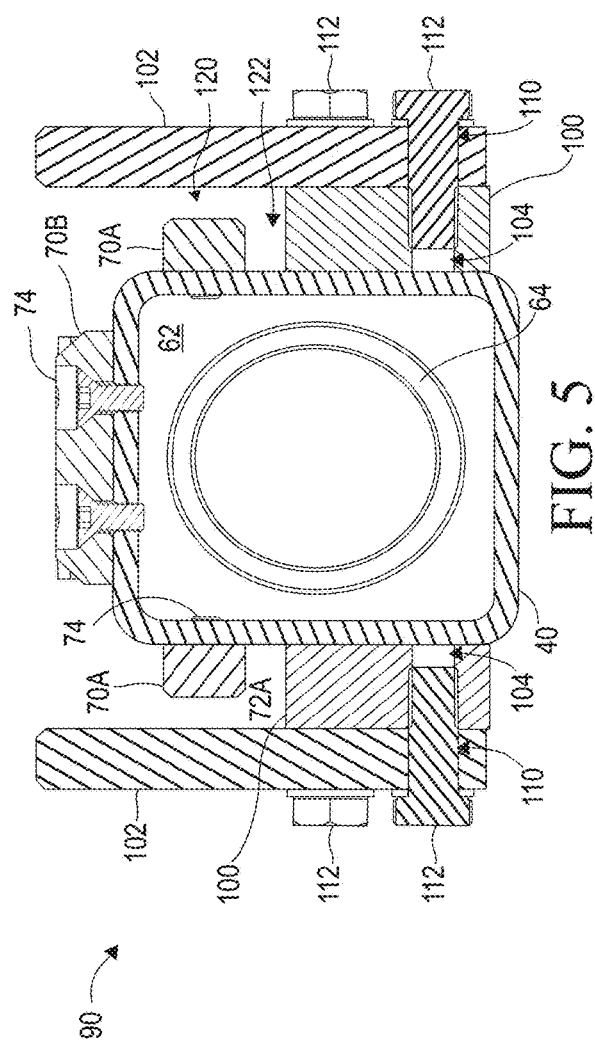
FIG. 5 is a cross-sectional view taken along line 5-5 of FIG. 4 showing side and upper slide blocks secured to corresponding walls of the main elongate shaft portion of the support assembly, and retainers fixed centrally along the length of the support assembly to be spaced outwardly from the main elongate shaft portion thereof beyond the side slide blocks.

Referring to FIG. 5, the central retention assemblies 90 include a spacer or spacer block 100 secured to the support shaft 40 at a side wall 72A of the support shaft 40, and a vertical retention member or plate 102 secured to the spacer block 100 that extends vertically upwardly along and upwardly beyond the sidewall 72A of the support shaft 40. The spacer block 100 can have fastener holes 104, and may be secured to the support shaft 40 via one or more welds. The retention plate 102 includes fastener holes 110 that are aligned with the fastener holes 104 of the spacer block 100 such that fasteners 112 received therein removably secure the retention plate 102 to the spacer block 100.

The retention plates 102 and side slide blocks 70A cooperate to form clearances therebetween. For example, a clearance between the retention plate 102 and a side slide block 70A forms a first or vertical receiving region 120 for receiving a side leg 214 of the cartridge 200 therebetween.

A clearance between the spacer block 100 and the side slide block 70A forms a second or horizontal receiving region 122 for receiving a retention rail 300 of the cartridge 200 therebetween, as discussed below. The receiving regions 120 and 122 communicate to form an L-shaped gap on either side of the square main shaft portion of the support shaft 40.

Figure 6:
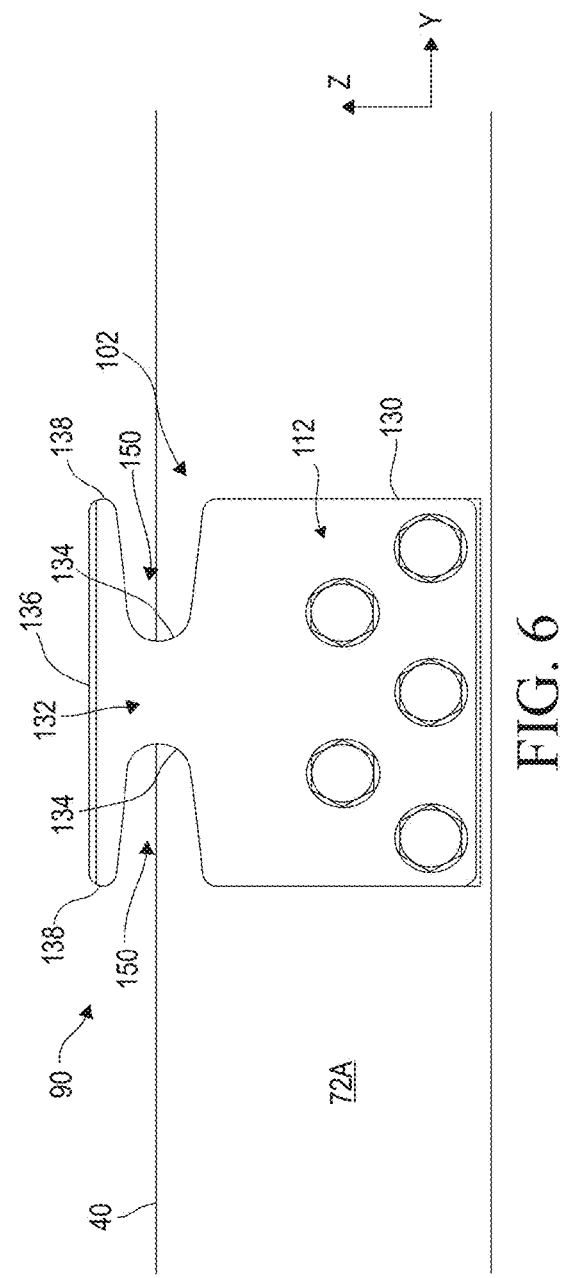
FIG. 6 is an elevational view of one of the retainers showing notches for receiving projections of the cartridge.

Referring to FIG. 6, the retention plate 102 includes a rectangular base portion 130 that is secured to the spacer block 100 via fasteners 112, a narrowed vertical neck portion 132 having arcuate walls or stop surfaces 134 that extend upwardly from the base portion 130, and an upper portion 136 that extends from the narrowed portion 132 and includes opposing retaining arms 138 that extend over the base portion 130. The base portion 130, the arcuate stop surfaces 134, and the arms 138 cooperate to form tapered slots 150 for receiving, guiding, and retaining projections 310 of the cartridge 200, as discussed in greater detail below.

Referring again to FIG. 4, the cartridges 200 each can include a gripping member 220 that may be in the form of a bracket or a plate for aiding an operator in sliding the cartridges 200 relative to the support assembly 60 during installation and removal of the cartridges 200. The gripping member 220 can be a right-angle bracket with one leg 220A that is secured (e.g., welded) to the upper wall 212 of the support rail 210. The gripping member 220 has a vertically upstanding leg 220B that includes a hole 222 that extends therethrough. The hole 222 is sized to receive a tool or fingers of an operator to facilitate securely grasping of the gripping member 220 during movement of the cartridge 200.

As shown in FIG. 4, the cartridges 200 each further include a pair of generally U-shaped slots 230 at an outer end portion 210A of the upper wall 212. As shown, the slots 230 open to the end of the upper wall 212. When a cartridge 200 is installed in its operative position on the support assembly 60, the slots 230 vertically align with the cartridge mount blocks 82 at the upper wall 72B of the support shaft 40 such that threaded openings 84 of the cartridge mount blocks 82 are exposed through the slots 230. The slots 230 have a length in the Y direction that is greater than a diameter of the threaded openings 84 such that the cartridge 200 need not be perfectly positioned along the long axis 80 of the support shaft 40 for the threaded openings 84 to be exposed through the slots 230.

With the cartridge 200 properly aligned on the support assembly 60, fasteners such as bolts 232 may be advanced through the slots 230 and into the threaded openings 84 to secure the outer end portion 210A of the support rail 210 to the support shaft 40 at the cartridge mount blocks 82 to restrict movement of the outer end portion 210A. As such, the support rail 210 may be secured at the inner end portion 210B by lateral projections 310 retained in the slots 150 of the retention assemblies 90, and positively anchored at the outer end portion 210A by bolts 232.

The cartridges 200 each carry one or more scraper blades 250 secured at the upper wall 212 of the support rail 210. In the approach shown, each cartridge 200 is sized to carry six scraper blades 250 thereon. In other approaches, a cartridge 200 may include fewer than six scraper blades 250 (e.g., a single, continuous scraper blade), or more than six scraper blades 250.

The scraper blades 250 can be made of a variety of resilient materials, such as urethane or other elastomer, or a combination of materials. For example, a scraper blade 250 may have a resilient body portion, such as an elastomeric or polymeric body portion, and a hard blade tip, such as a carbide tip.

A lower, mounting base portion 252 of a scraper blade 250 includes a central retention portion 254. As shown, the central retention portion 254 has an inverted-T configuration having laterally extending bottom foot portions 254A. The mounting base portion 252 also includes outer, side flanges 256 that taper outwardly to direct scraped material outside of side legs 214 to minimize debris accumulation between the interface of the cartridge 200 and support assembly 60. Interior walls of the side flanges 256 cooperate with the central retention portion 254 to form channels 258 therebetween. As discussed below, the channels 258 are configured to snugly receive blade rails 270 of the support assembly 60 slidingly therein to secure the scraper blades 250 to the support shaft 40.

Figure 8:
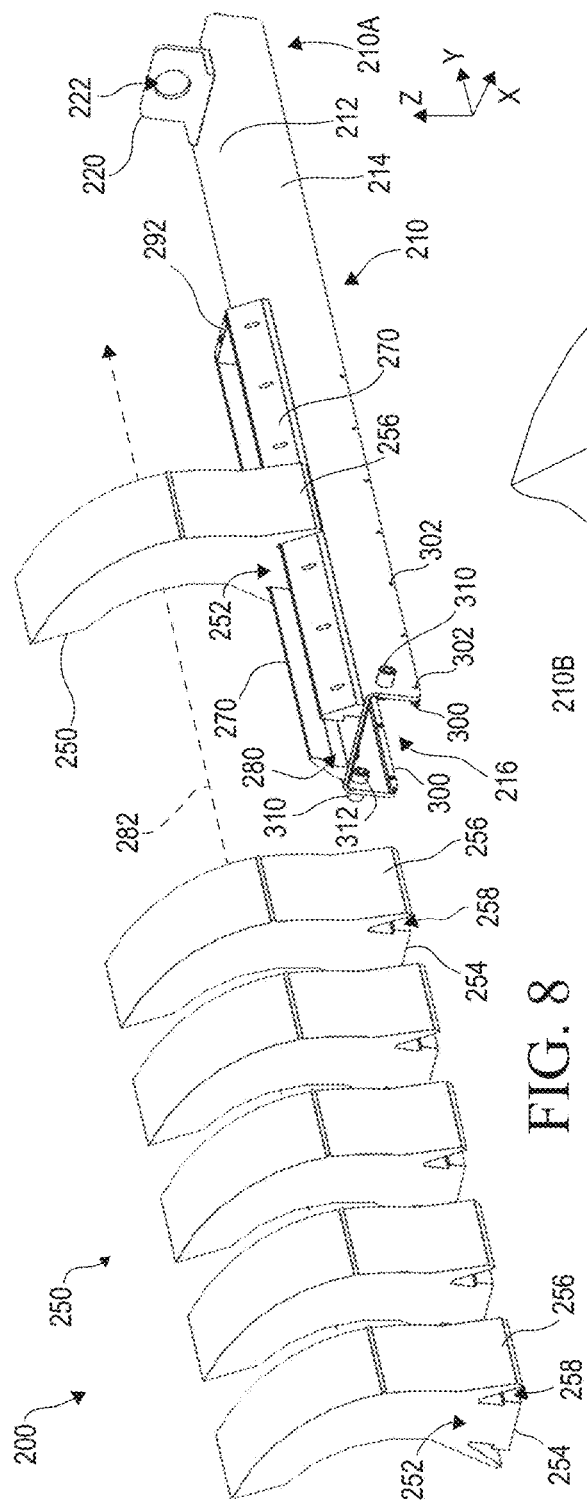
FIG. 8 is a perspective view of the cartridge during sliding installation of the scraper blades on the blade mounting rails longitudinally along the cartridge.
Figure 9:
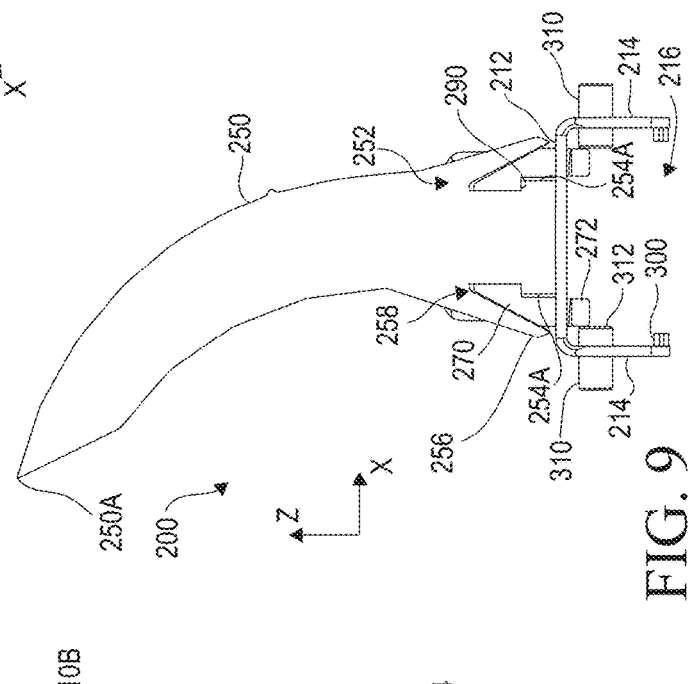
FIG. 9 is an end elevation view of the cartridge with the scraper blades installed thereon showing an inverted-T mounting base portion of the scraper blade captured between the blade mounting rails.
Figure 7:
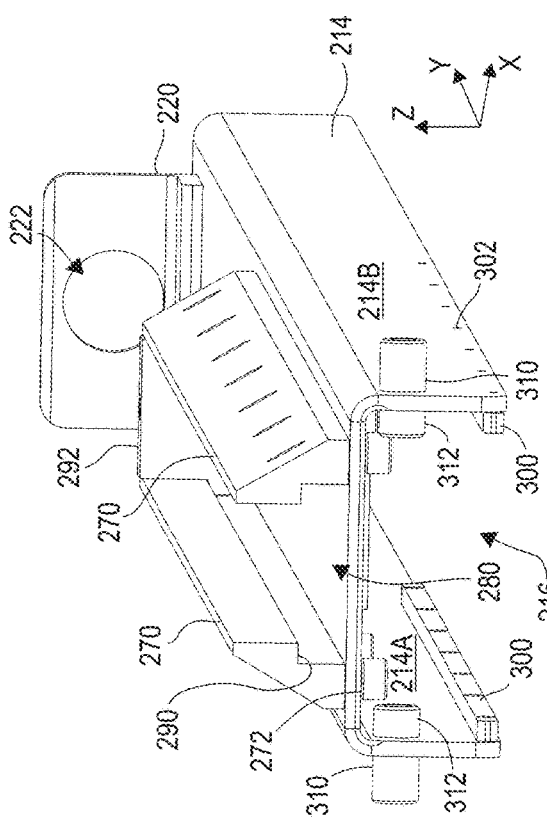
FIG. 7 is a perspective view of a cartridge without scraper blades installed thereon showing a pair of upstanding blade mounting rails of the cartridge.

Referring FIGS. 7-9, the cartridge 200 includes opposing elongate blade retainers or rails 270 that are removably secured to the upper wall 212 of the support rail 210. As shown in FIGS. 7 and 9, the blade rails 270 are mechanically secured to the upper wall 212 via fasteners 272. As compared to welding, mechanical fastening of the blade rails 270 to the support rail 210 reduces distortion (e.g., curl) of the blade rails 270, which may otherwise cause misalignment and binding of the blade rails 270 within the channels 258 of the scraper blade 250 as the scraper blades 250 are slid over the blade rails 270. Furthermore, the removable nature of the blade rails 270 allows an operator to replace the blade rails 270 or substitute the blade rails 270 with different blade rails that are configured and dimensioned to secure different scraper blades to the support rail 210. With the blade rails 270 secured to the support rail 210, the opposing blade rails 270 cooperate to form a channel 280 therebetween.

As shown in FIG. 8, to install a scraper blade 250, a base portion 252 of a scraper blade 250 is slid along the upper wall 212 of the support rail 210 between the blade rails 270, as indicated at 282. In this way, the retention portion 254 of the base portion 252 is passed through the channel 280 formed between the blade rails 270. As the retention portion 254 passes within the channel 280, the blade rails 270 extend within the channels 258 (FIG. 9) formed between the side flanges 256 and the retention portions 254. To limit sliding of the scraper blade 250 in a lateral, outward longitudinal direction along the support rail 210 (e.g., along the Y axis toward the engagement member 220), a key block 292 may be secured (e.g., mechanically fastened) at an outer end of the blade rails 270.

As shown in FIG. 9, the blade rails 270 also include retaining shoulder surfaces 290 that generally extend horizontally or parallel to the upper wall 212 of the support rail 210. Extension foot portions 254A of the inverted-T retention portions 254 are substantially fixedly held between the shoulder surfaces 290 and the upper wall 212 such that the retaining shoulder surfaces 290 inhibit movement of the scraper blade 250 in a vertical direction away from the upper wall 212 (e.g., along the Z axis).

With reference to FIGS. 1A, 1B, and 9, with the scraper blades 250 installed, the blade rails 270 cooperate with the base portions 252 of the scraper blades 250 to maintain tips 250A (FIG. 9) of the scraper blades 250 in engagement with the surface of the conveyor belt. For example, during operation of a conveyor belt with the scraper blades 250 engaged with the surface of the conveyor belt, discontinuities (such as mechanical belt fasteners) or other irregularities in the surface of the belt may tend to drive the scraper blade tips 250A engaged therewith outwardly (e.g., in the X direction) and downwardly (e.g., in the Z direction). With the base portions 252 of the scraper blades 250 secured in the blade rails 270, the blade rails 270 provide opposing forces to retain the base portions 252 as the scraper blade tips 250A flex away from the belt. When the belt surface irregularities pass by the blade tips 250A, the blade rails 270 facilitate the base portions 252 biassing the blade tips 250A back in the direction of the belt. The tensioners 42 of the blade cleaner 30 may also permit rotation of both the blade rails 270 and base portions 252 of the scraper blades 250 relative to the belt (e.g., in the clockwise direction of FIGS. 1A and 1B), as discussed below.

The cartridges 200 include retention rails 300 secured to opposing inner surfaces 214A of the depending side legs 214 of the support rail 210 toward the bottom ends thereof. The retention rails 300 may be elongate retention rails that extend within the channel 216 formed between the side legs 214. The retention rails 300 are removably secured to the inner surfaces 214A of the side legs 214, for example, by mechanical fasteners 302. As compared to welding, mechanical fastening of the retention rails 300 to the support rail 210 reduces distortion of the retention rails 300. For example, distortion of a retention rail 300 may cause the retention rail 300 to be misaligned with the clearance of the receiving region 122 (FIG. 5) formed between the spacer block 100 and the side slide block 70A further causing engagement and potential binding of the rail 300 with either block 100 or 70A during the sliding cartridge installation and removal procedures. As discussed in greater detail below, the retention rails 300 cooperate with the side slide blocks 70A to maintain the cartridges 200 on the support assembly 60 during such installation and removal of the cartridges 200.

The cartridges 200 further include projections 310 secured to outer surfaces 214B of the side legs 214 of the support rail 210; for example, at an upper portion of the side legs 214. The projections 310, which may be in the form of bosses, are secured to the outer surfaces 214B, for example, by mechanical fasteners 312 that extend through the side leg 214. As discussed below, the projections 310 secure a longitudinally inner or distal end portion 210B of the support rail 210 to the support assembly 60.

Referring again to FIG. 4, an assembled cartridge 200 is secured to the support assembly 60 by aligning the inner end portion 210B of the support rail 210 with an end of the support shaft 40, as indicated at 320. The cartridge 200 is then slid along the support shaft 40 such that the upper wall 212 of the support rail 210 slides across the upper slide blocks 70B, and the side legs 214 of the support rail 210 slide across the side slide blocks 70A. As discussed, the slide blocks 70 are formed of a low friction material such as a plastic to facilitate sliding of the metal support rail 210 longitudinally along the support assembly 60. The low friction interface (e.g., metal-on-plastic interface) between the support rail 210 and the slide blocks 70 has a lower coefficient of friction compared to, for example, a metal-on-metal interface. Furthermore, by engaging only the discrete, relatively small slide bocks 70 and not the support shaft 40, the contact surface area between the support rail 210 and the support assembly 60 is greatly reduced, further facilitating ease of sliding of the cartridge 200 longitudinally along the support assembly.

Referring to FIGS. 2, 3, and 6, the cartridges 200 are slid along the support shaft 40 such that the projections 310 enter into the tapered slots 150 of the retention plates 102. During the sliding of the cartridge 200, the projections 310 may engage the lower or upper surfaces of the tapered slots 150 such that the tapered slots 150 guide the projections 310 upwardly or downwardly, respectively. For example, when the projections 310 are slid below a centerline of the tapered slots 150 (e.g., due to the weight of the cartridge 200), the tapered upper walls of the base portions 130 bias the projections 310 upwardly toward the centerline. Similarly, when the projections 310 are slid above a centerline of the tapered slots 150, the tapered lower walls of the arms 138 bias the projections 310 downwardly toward the centerline.

The cartridges 200 are slid along the support shaft 40 until the projections 310 abut (or "bottom out" against) the arcuate stop surfaces 134, which block further axial or longitudinal sliding of the cartridges 200 along the Y axis. The arms 138 of the retention plates 102 cooperate with the base portions 130 to tightly retain the projections 310 therebetween to inhibit vertical movement (e.g., along the Z axis) of the inner end portion 210B of the support rail. In this way, the retention plates 102 cooperate with the projections 310 to anchor the inner end portion 210B to the support assembly 60.

Figure 10:
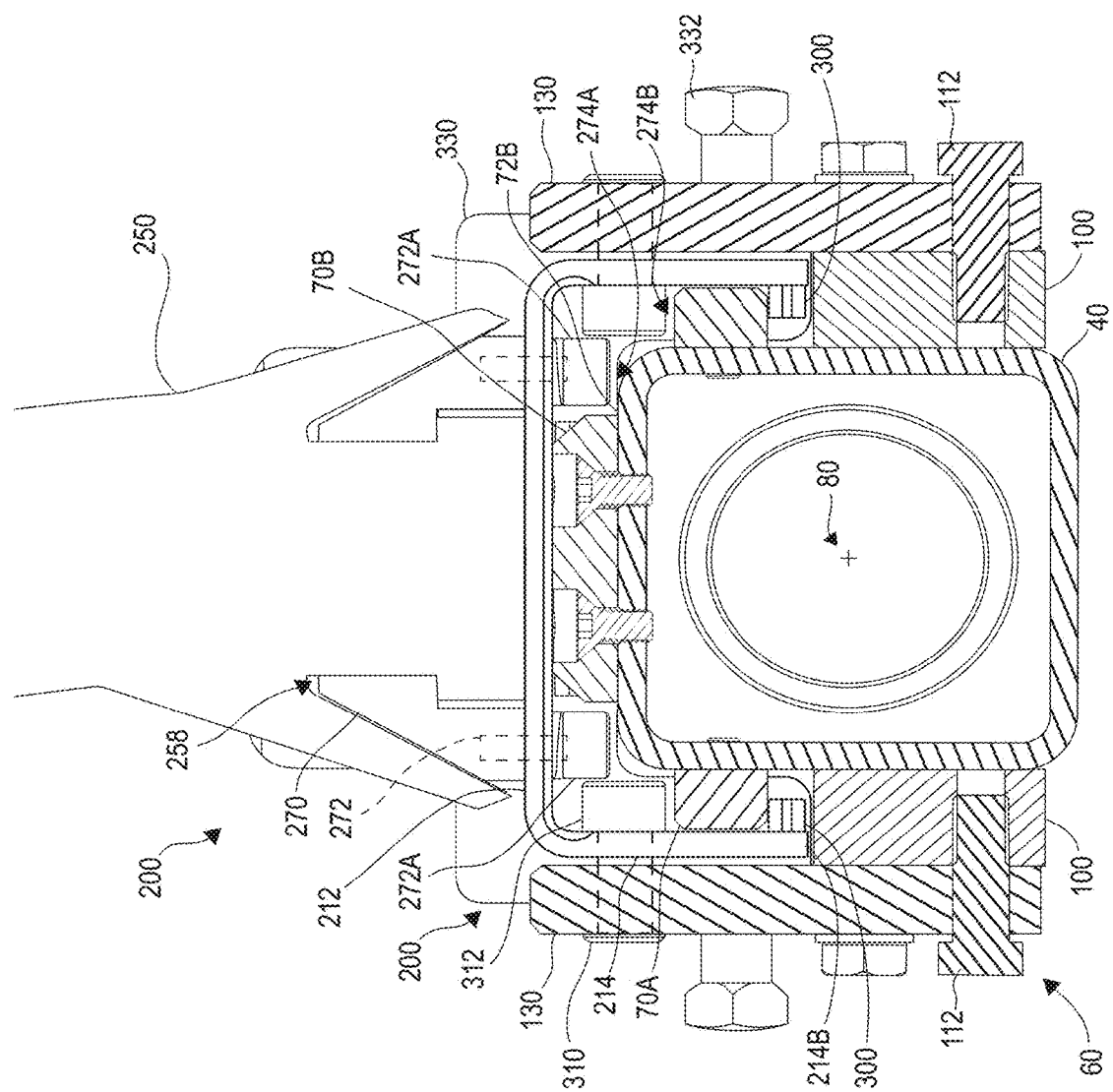
FIG. 10 is an enlarged, cross-sectional view taken along line 10-10 of FIG. 2 showing the cartridge secured to the support assembly in its operative position with a clearance space therebetween sized to receive retention rails and blade rail fastener heads of the cartridge adjacent to and spaced from the slide blocks.

Referring to FIG. 10, the side slide blocks 70A cooperate with the side legs 214 of the support rail 210 to maintain lateral alignment of the support rail 210 as the cartridge 200 is longitudinally slid along the elongate support assembly 60. For example, if the cartridge 200 were to start skewing off axis 80 during longitudinal sliding thereof, the encroached side slide block 70A will redirect the encroaching side leg 214, and thereby the support rail 210, back on-axis.

As the cartridge 200 is slid along the support assembly 60, the upper wall 212 of the support rail 210 slides along the upper slide blocks 70B to be spaced from the corresponding upper wall 72B of the support shaft 40 to create an upper portion of the inverted U-shaped clearance space 274A. The enlarged heads 272A of the fasteners 272 that secure the blade rails 270 to the upper wall 212 are received in this upper portion of the clearance space 274A with this clearance space upper portion 274A sized in the vertical direction so that the heads 272A are closer to but still vertically spaced from the upper wall 72B of the support shaft 40. Further, the heads 272A are located in the clearance space upper portion 274A so that they are spaced laterally between the upper slide blocks 70B and the side legs 214 of the support rail 210. In this way, the fastener heads 272A are in clearance with and do not contact the support assembly 60 during installation or removal of the cartridges 200. The side walls 214 of the support rail 210 slides along the side slide blocks 70A to be spaced from the corresponding side wall 72A of the support shaft 40 to create a side portion of the inverted U-shaped clearance space 274B. The side slide blocks 70A are received in this side portion of the clearance space 274B with this clearance space side portion 274B sized so that the side slide blocks 70A are horizontally spaced from the side legs 214. Further, the mechanical fasteners 312 that secure the projections 310 to the side walls 214 are received in this clearance space side portion 274B so as to be vertically spaced from the side slide blocks 70A and horizontally spaced from the side walls 72A of the support shaft 40.

When the support rail 210 is aligned with and centered on the support assembly 60, a clearance is provided between the side slide blocks 70A and the side legs 214 of the support rail 210. For example, the side legs 214 nominally may have a one millimeter clearance to the outer side surface of the side slide block 70A, and the retention rails 300 may have a nominal one millimeter clearance to the lower surface of the side slide block 70A. In a normal installation or removal procedure, some low friction sliding contact between the side slide blocks 70A and the side legs 214 and/or retention rails 300 of the support rail 210 and may occur.

The retention rails 300 cooperate with the side slide blocks 70A to maintain the cartridges 200 on the support assembly 60 during sliding installation and removal of the cartridges 200. More particularly, as shown in FIG. 10, with the cartridge 200 installed on the support shaft 40, the retention rails 300 protrude laterally inward below the side slide blocks 70A. In this way, if a cartridge 200 were to tip (e.g., rotate about axis 80), a retention rail 300 at the upwardly acting side of the cartridge 200 would be tilted into engagement with the side slide blocks 70A and would inhibit further tipping of the cartridge 200. In this way, the retention rails 300 keep the cartridge 200 from movements transverse to the longitudinal sliding direction of the cartridge 200 such as could be generated by undesired tipping during installation and removal of the cartridge 200.

Figures 11, 12:
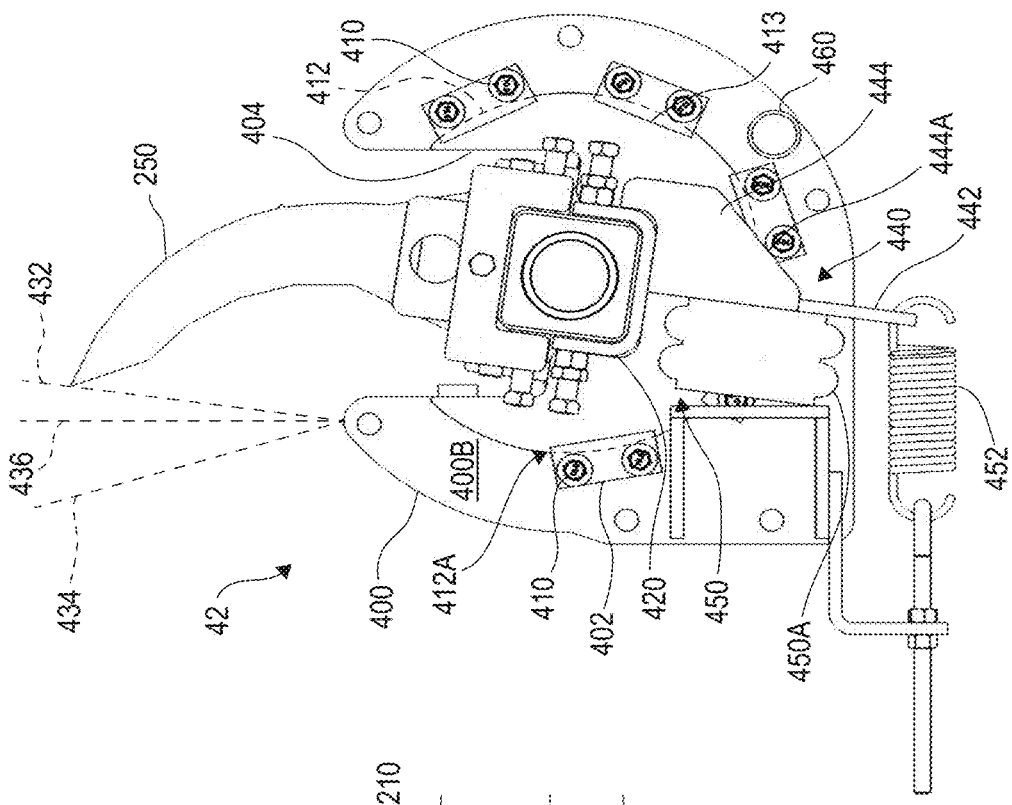
FIG. 11 is a side elevation view of the support assembly showing a set screw engaged with an outer end portion of the cartridge to urge the cartridge to its operative position.
FIG. 12 is an elevational view of a tensioner showing an actuator in a deactivated state and an extension spring pulling a rotary bracket to rotate the scraper blades to a disengaged orientation.

As discussed, during installation of a cartridge 200, the cartridges 200 are slid along the support shaft 40 until the projections 310 abut arcuate stop surfaces 134 within the tapered slots 150 of the retention assemblies 90. With reference to FIG. 11, to further the secure the projections 310 within the tapered slots 150 of the retention assemblies 90, a set member 330, which may be in the form of a bracket, may be installed on the support shaft 40 and positioned so as to be adjacent the outer end portion 210A of the support rail 210 when the cartridge 200 is received on the support assembly 60. The set member 330 may be secured to the support shaft 40, for example, with one or more set screws 332 that extend through a side of the set member 330 to fix the set member 330 to the support shaft 40. A drive member in the form of a screw 334 may be received through a threaded aperture 336 of the set member 330 to be rotatably driven into engagement with the outer end portion 210A of the support rail 210. In this way, the support rail screw 334 operates to ensure that the cartridge 200 is at its installed, operative position on the support shaft 40. As discussed, bolts 232 may then be installed to secure the outer end portion 210A of the cartridge 200 to the support shaft 40.

With reference to FIGS. 2, 3, and 11-13, the support assembly 60 is securable to tensioners 42 at opposite ends of the support assembly 60 for moving the support assembly 60 and scraper assembly 50 so that the scraper blades 250 can be shifted into engagement with a conveyor belt and so that the force of engagement of the blades with the belt can be controlled by the tensioners 42. A tensioner 42 includes a mounting plate 400 that is operable to secure the tensioner 42 to a side wall of a conveyor structure typically disposed along either side of the conveyor belt. The mounting plate 400 includes U-shaped arms 400A (FIG. 13) defining a central space 401 therebetween. The central space 401 opens upwardly to allow the cartridge 200 to be lowered into and lifted out from the central space 401, as described further hereinafter.

Figure 13:
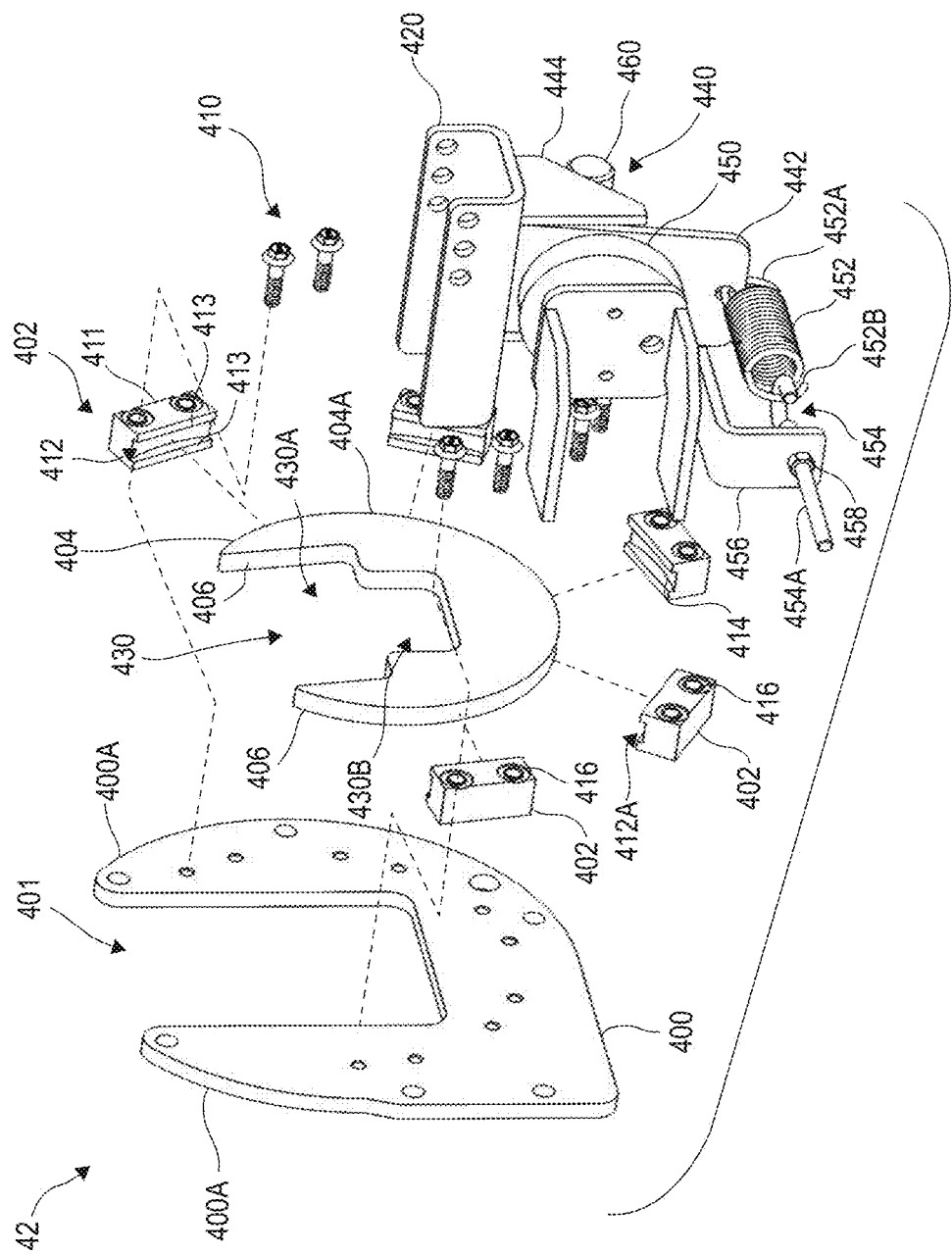
FIG. 13 is an exploded view of the tensioner of FIG. 12 showing a fixed mounting plate, cradle plate guides for being secured to the mounting plate, and a rotatable cradle plate for being rotated by operation of the actuator.

As shown in FIG. 13, the cradle plate 404 has an arcuate outer edge 404A and a cradle notch 430 extending between arms 406 of the cradle plate 404. An upper portion 430A of the cradle notch 430 may have a width that corresponds to the central space 401 of the mounting plate 400 such that the upper portion 430A and central space 401 allow a cartridge 200 to be raised and lowered therein.

A plurality of cradle plate guides 402 in the form of guide blocks 402A are secured to the mounting plate 400 for mounting the cradle plate 404 to the mounting plate 400, as shown in FIGS. 11-13. The cradle plate guides 402 include a block body 411 having sidewalls 413 that form grooves 412 therebetween. As shown in FIG. 12, the sidewalls 413 have depths that vary along the groove 412. The grooves 412 have opposite open ends 412A. The grooves 412 include inner arcuate guide surfaces 414 (see FIGS. 12 and 13) formed at a recessed bottom of the grooves 412. The inner arcuate guide surfaces 414 of the guides 402 may all have the same radius of curvature. The radius of curvature may correspond to a radius of the outer arcuate periphery of the cradle plate 404 such that the inner guide arcuate surfaces 414 engage with the curved outer surface of the cradle plate and guide the cradle plate 404 as it is rotated, as described below.

The cradle plate guides 402 are removably mounted to the mounting plate 400 via fasteners 410. The cradle plate guides 402 are circumferentially spaced apart on the mounting plate 400 such that the inner arcuate guide surfaces 414 have the same radial distance to a central axis of rotation 80. The circumferential spacing of the cradle plate guides 402 may be such that adjacent cradle plate guides 402 are spaced such that gaps in between are approximately 1 inch, approximately 3 inches, approximately 5 inches, or more than 5 inches. The circumferential spacing of the cradle plate guides 402 about the central axis of rotation 80 allows for foreign material such as dirt and other debris to exit from entrapment between the cradle plate guides 402 and the cradle plate 404 as the cradle plate 404 rotates about the central axis of rotation 80.

The cradle plate guides 402 may include insert sleeves 416 (see FIGS. 11 and 13) disposed within mounting holes of the cradle plate guides 402. The insert sleeves 416 may be cylindrical sleeves that receive fasteners 410 therethrough for mounting the cradle plate guides 402 to the mounting plate 400. The insert sleeves 416 are formed of a harder material than the block bodies 411 of the cradle plate guides 402. For example, the cradle plate guides 402 may be formed of a self or dry lubricating plastic (e.g., mineral-filled, ultra-high molecular weight (UHMW) polyethylene), graphite, or molybdenum disulfide (MoS2)-filled nylon material. The insert sleeves 416 may be formed of a sufficiently hard material such as steel to limit compressive load on the cradle plate guides 402. In this way, the insert sleeves 416 may prevent distortion of the cradle plate guides 402 that may otherwise occur due to overtightening of the fasteners 410. Such distortion may cause the cradle plate guide sidewalls 413 to exert clamping forces (i.e., bind) against the cradle plate 404, thereby interfering with or inhibiting rotation of the cradle plate 404 relative to the mounting plate 400.

The cradle plate guides 402 support the cradle plate 404 and guide rotation of the cradle plate 404 relative to the mounting plate 400. For example, the grooves 412 have widths just greater than the thickness of the cradle plate 404 such that the cradle plate 404 is received within and guided by each of the grooves 412. With the cradle plate 404 rotatably mounted to the cradle plate guides 400 at one side 400B of the mounting plate 400, the cradle plate 404 is spaced from the side of the mounting plate 400 as indicated at 405 in FIG. 11. Thus, the distance the cradle plate 404 is spaced from the one side 400B of the mounting plate 400 corresponds to a thickness of the cradle plate guide sidewall 413 secured to the mounting plate 400.

The cradle plate 404 includes a central cradle notch 430 (FIG. 13) that has a pole bracket or cradle 420 secured (e.g., welded) thereto. The pole cradle 420 is sized to receive the support shaft 40 therein when the support shaft 40 is installed in the pole cradle 420. The support shaft 40 is removably secured to the pole cradle 420, for example, via one or more (e.g., six) set screws 422. The set screws 422 engage the outer surface of the support shaft 40 such that the support shaft 40 is axially and rotatably fixed relative to the pole cradle 420. In this way, the support shaft 40 need not be provided with apertures or other engagement features in order to secure the support shaft 40 to the tensioners 42.

A rotary member 440, which may be in the form of a bracket, is fixedly secured (e.g., via one or more welds) to the pole cradle 420 such that rotation of the rotary member 440 (e.g., via actuator 450 and/or return spring 452) effects a corresponding rotation of the pole cradle 420 and cradle plate 404 about the central axis of rotation 80. The rotary member 440 includes an actuator plate 442 that engages with the actuator 450 and the return spring 452, and spaced gusset plates 444 that are connected to either side of the actuator plate 442 toward the upper portion thereof and extend transversely from the actuator plate 442. The gusset plates 444 are connected at their upper edges to the base of the pole cradle 420, and have an extension portion that projects up from the outer side thereof along the outer side wall of the cradle to which it is connected so that the gusset plates 444 are securely fixed to the pole cradle 420. A stop member 460 is secured to the mounting plate 400 in the path of rotation of one or both gusset plates 444, and specifically an inclined edge 444A thereof, to limit rotation of the rotary member 440 relative to the mounting plate 400.

As shown in FIG. 13, the return spring 452 includes a first end portion 452A and a second end portion 452B that each may be in the form of a hook. The first end portion 452A is secured to the actuator plate 442; for example, through a hole in the actuator plate 442. The second end portion 452B is secured to an anchor hook 454. An arm portion 454A of the anchor hook 454 may be adjust relative to a base bracket 456 (for example, via an adjustment nut 458) to axially adjust the second end portion 452B of the return spring 452 relative to the actuator plate 442 to adjust the tension or compression of the return spring 452.

The actuator 450 may be a pneumatic actuator that includes a pressurized bladder 450A that is actuated and deactivated (e.g., via a solenoid that directs air flow into and out of the pressurized bladder 450A) to selectively rotate the rotary member 440. With the actuator 450 deactivated, the return spring 452 returns toward its unbiased configuration to pull on the rotary member 440 in a clockwise direction in FIG. 12, thereby biasing the support assembly 60 and scraper assembly 50 to a rotational orientation wherein the scraper blades 250 are disengaged from a conveyor belt (e.g., orientation 432). Such an orientation permits an operator to service the conveyor belt or cartridge 200, or to remove the cartridge 200 from the support assembly 60.

Upon actuation or activation of the actuator 450, the bladder 450A is pressurized to overcome the return force effected by the return spring 452 on the rotary member 440 such that the spring is extended. The actuator 450 causes the pole cradle 420 to rotate the support assembly 60 and scraper assembly 50 in a counterclockwise direction in FIG. 12 to a rotational orientation wherein the scraper blades 250 are engaged with a conveyor belt. The cradle plate 404 is rotatable relative to the mounting plate 400, for example, through a 25-degree range of rotation between a scraper blade disengagement orientation 432, a scraper blade engagement orientation 434, and one or more intermediate angular orientations 436 therebetween. In the scraper blade disengagement orientation 432, the scraper blades 250 may be spaced approximately 1 inch or more from the conveyor belt. The bladder 450A is pressurized to a desired tension force between the scraper blades 250 and the belt.

Figure 14:
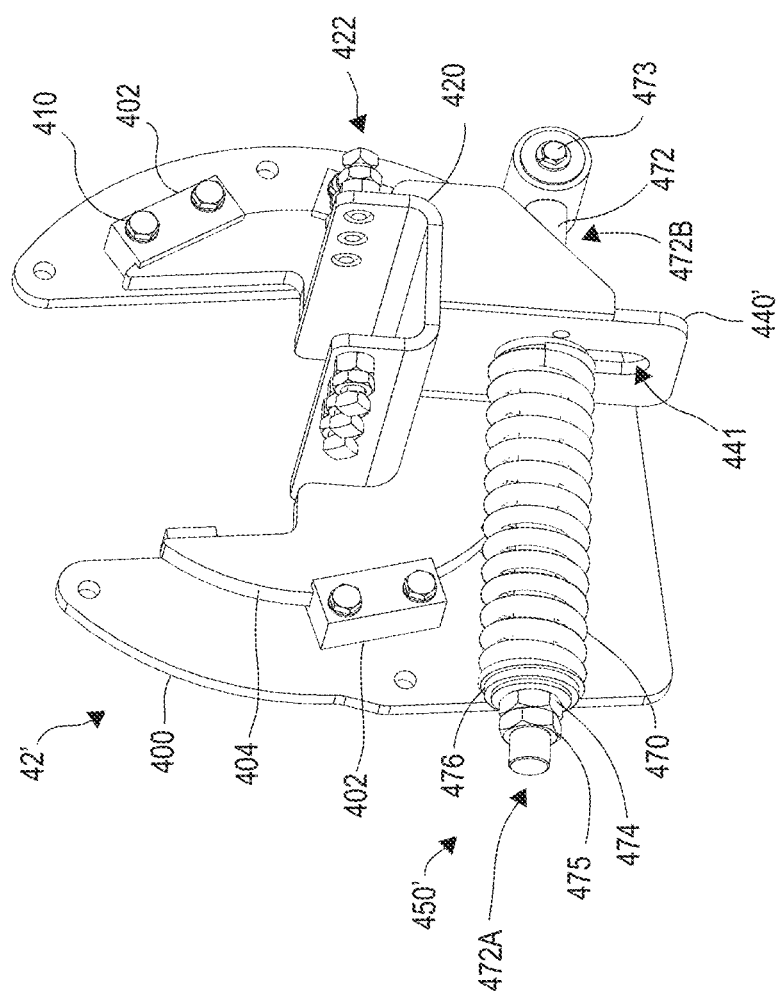
FIG. 14 is a perspective view of another tensioner including a compression spring for supporting and rotating the support assembly and cartridge relative to a conveyor belt.

Referring to FIG. 14, another tensioner 42" is shown for supporting and rotating the support assembly 60 and scraper assembly 50 relative to a conveyor belt. The tensioner 42' differs from the tensioner 42 of FIGS. 2, 3, and 11-13 in that the actuator 450' includes a compression spring 470 disposed about a threaded pivot arm 472. The pivot arm 472 includes a free end 472A and a fixed end 472B that is fixed to and rotatable about a pivot member 473. The pivot arm 472 extends through a slot 441 of the rotary member 440' such that the pivot arm 472 shifts or traverses through the slot 441 during rotation of the rotary member 440' (e.g., as caused by the adjustment mechanisms discussed below).

The actuator 450' includes adjustment mechanisms such as an adjustment nut 474 and jam nut 475 that are threaded on the free end of the pivot arm 472 to adjust an axial position of a spring abutment washer 476 along the pivot arm 472. For example, rotation of adjustment nut 474 in a first rotational direction causes the washer 476 to compress the spring 470 so that the compressed spring 470 biases the rotary member 440' for rotation, which thereby rotates the support assembly 60 and the scraper assembly 50 to a rotational orientation wherein the scraper blades 250 are engaged with a conveyor belt (e.g., orientation 434 in FIG. 12). Rotation of the adjustment nut 474 in a second rotational direction opposite the first rotational direction relaxes the compression spring 470 to thereby permit the rotary member 440', the support assembly 60, and the cartridge 200 to rotate to a rotational orientation (e.g., orientation 432 in FIG. 12) wherein the scraper blades 250 are disengaged from the conveyor belt. The jam nut 475 may be rotated toward the adjustment nut 474 to lock the adjustment nut 474, and may be rotated away from the adjustment nut 474 to release the adjustment nut 474.

Figure 15:
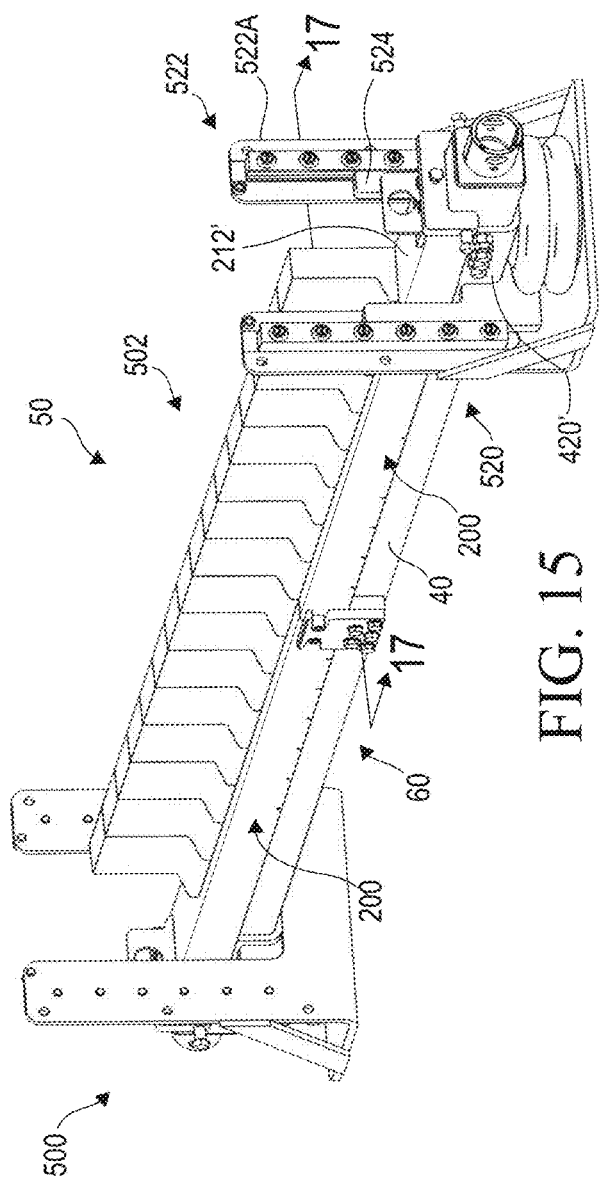
FIG. 15 is a perspective view of another cleaning assembly for use as a secondary cleaner having a pneumatic actuator for vertically moving elastomeric scraper blades into and out of engagement along a return run of a conveyor belt.
Figure 16:
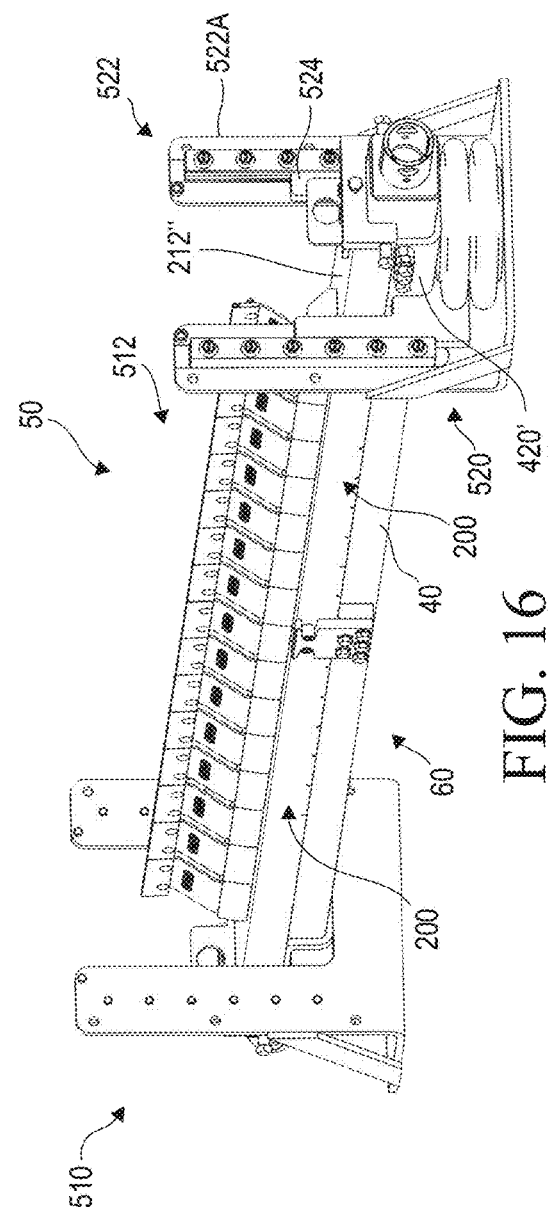
FIG. 16 is a perspective view of still another cleaning assembly for use as a secondary cleaner having a pneumatic actuator for vertically moving scraper blade assemblies having spring metal layback mounting portions and scraper blades secured to the layback portion.
Figures 17, 18:
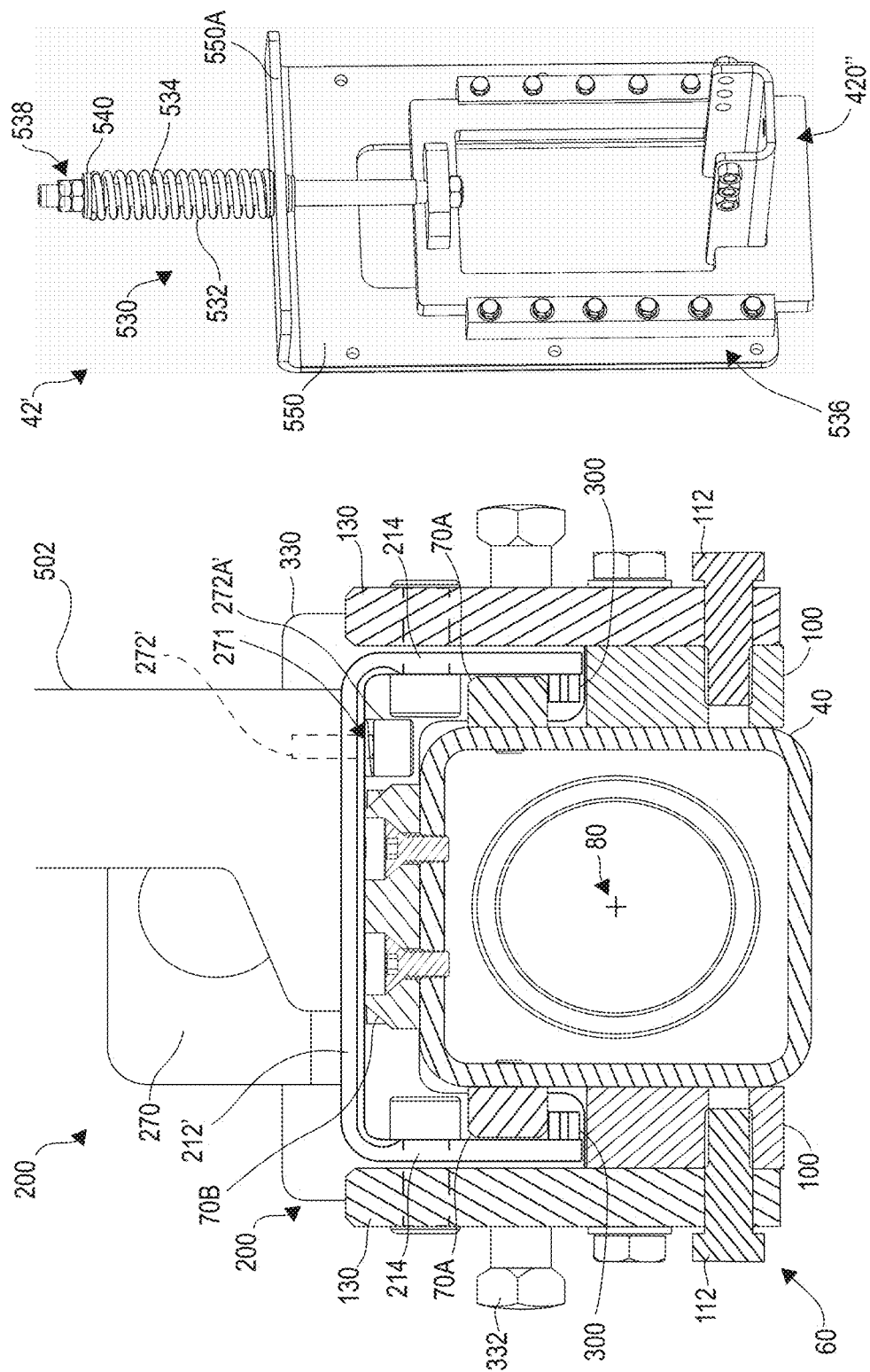
FIG. 17 is an enlarged cross-sectional view taken along line 17-17 of FIG. 15 showing a cartridge secured to a support assembly in its operative position with a clearance space therebetween sized to receive retention rails and blade rail fastener heads of the cartridge adjacent to and spaced from the slide blocks.
FIG. 18 is a perspective view of another tensioner for raising and lowering the pole assemblies and cartridges of the cleaning assemblies of FIGS. 14 and 15.

Referring now to FIGS. 15-17, belt cleaners in the form of secondary belt cleaners are shown. Secondary belt cleaners are positioned downstream from a primary belt cleaner (such as belt cleaner 30) along and below a return run of the conveyor belt to further remove carryback from the conveyor belt.

The belt cleaners 500, 510 have many of the same features as belt cleaner 30. As such, common parts are referred to with like reference numerals. For example, the cartridges 200 of belt cleaners 500, 510 are split cartridges that include two cartridges 200. Furthermore, and with reference to FIG. 17, the interface between the cartridges 200 and the support assembly 60 provides the benefits discussed with respect to belt cleaner 30. The belt cleaners 500, 510 differ from belt cleaner 30 in that the upper walls 212', 212" have fastener holes 271 at different locations than those of belt cleaner 30 for receiving fasteners 272' and securing the scraper blades 502, 512 to the cartridges 200. Similar to the heads 272A of the fasteners 272, the heads of 272A of the fasteners 272 are received in an upper portion of the clearance space formed between the upper walls 212', 212" of the cartridges 200 and the support assemblies 60.

Belt cleaner 500 of FIG. 15 further differs from belt cleaner 510 of FIG. 16 in the type of scraper blades 502, 512 that are secured to the cartridges 200. For example, the scraper blades 502 of belt cleaner 500 are formed of urethane or other elastomer, whereas the scraper blades 512 of belt cleaner 510 include a spring metal layback portion and a scraper blade secured to the layback portion. The scraper blades 512 of belt cleaner 510 may generally correspond to the scraper blades disclosed in U.S. Pat. No. 6,823,983, entitled "Conveyor Belt Cleaner," which is hereby incorporated by reference as if fully set forth herein.

The belt cleaners 500, 510 utilize a tensioner having a vertically-acting actuator 520 to raise and lower the support assembly 60 and the scraper assembly 50 disposed thereon. The actuator 520 may be a pneumatic actuator including a bladder for being inflated with pressurized fluid or air that selectively inflates and deflates to lift and lower the pole cradle 420' with the support shaft 40 secured therein. Raising and lowering of the pole cradle 420' is guided by the side guide arms 522A of the U-shaped mounting plate 522. Sides of the cradle plate 524 for the pole cradle 420' and side guide arms 522A have bearings so that that cradle plate 524 can shift vertically along the arms 522A with operation of the actuator 520 and during conveyor belt operation.

In another approach, and referring to FIG. 18, a tensioner 42" includes a spring-biased actuator 530. The actuator 530 includes a compression spring 532 having coils that extend about a threaded actuator rod 534. The actuator rod 534 extends through an opening in an upper shelf wall 550A of the tensioner mounting plate 550 and is fixedly secured at its lower end to a pole cradle assembly 420" such that vertical movement of the actuator rod 534 in up and down directions effects a corresponding vertical movement of the pole cradle assembly 420". When compressed, the compression spring 532 biases a spring abutment washer 540 upwardly to urge the pole cradle assembly 420" and a cartridge secured thereto upwardly toward a conveyor belt. The actuator 530 includes adjustment mechanisms such as adjustment nuts 538 that are threadedly guided along the actuator rod 534. To vertically adjust a position of the pole cradle assembly 420", the adjustment nuts 538 are rotated in a tightening rotational direction to travel down along the actuator rod 534 to compress the spring 532 thereby causing the spring 532 to bias spring abutment washer 540, the actuator rod 534, and pole cradle assembly 420" in an upward direction toward the conveyor belt, or in a loosening opposite rotational direction to travel up along the actuator rod 534 to allow the spring 532 to decompress, allowing the actuator rod 534 and pole cradle assembly 420" to shift in an downward direction away from the conveyor belt. Raising and lowering of the pole cradle 420" is guided by vertical side guide bearings 536.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A belt cleaner assembly comprising:
an elongate support member for extending longitudinally across a conveyor belt;
a cartridge for supporting at least one scraper blade thereon, the cartridge slidable over the support member; and
slide blocks between the support member and the cartridge to space facing surfaces of the cartridge and the support member from each other,
wherein the cartridge has a pair of side walls depending from either side of an upper wall to space the side walls for receiving the elongate support member therebetween with the upper wall engaged on the slide blocks for sliding thereon.

2. The belt cleaner assembly of claim 1 wherein the slide blocks are of a lower friction material than a material from which the cartridge is formed.

3. The belt cleaner assembly of claim 1 wherein the cartridge is of a metallic material and the slide blocks are of a polymeric material.

4. The belt cleaner assembly of claim 1 wherein the support member includes an upper surface, and the slide blocks are secured to the upper surface of the support member to support the cartridge on the slide blocks.

5. The belt cleaner assembly of claim 1, wherein the cartridge includes a support rail having the upper wall and the side walls, and blade retention rails for retaining the at least one scraper blade therebetween, the blade retention rails removably securable to the upper wall of the support rail so that the at least one scraper blade retained between the blade retention rails projects upwardly from the upper wall of the support rail.

6. The belt cleaner assembly of claim 5 wherein the support rail upper wall includes an upper surface and a lower surface and the elongate support member has an upper surface facing and spaced from the upper wall lower surface of the support rail by the slide blocks, and fasteners of the blade retention rails for removably securing the blade retention rails to the support rail upper wall include fastener heads at the lower surface of the support rail upper wall with the slide blocks being sized to provide the fastener heads clearance from the elongate support member upper surface with the cartridge slid over the elongate support member.

7. A belt cleaner assembly comprising:
an elongate support member for extending longitudinally across a conveyor belt;
a cartridge for supporting at least one scraper blade thereon, the cartridge slidable over the support member; and
slide blocks between the support member and the cartridge to space facing surfaces of the cartridge and the support member from each other,
wherein the support member comprises a support shaft having a generally square cross-sectional configuration with upper and lower surfaces extending between lateral side surfaces having the slide blocks disposed thereon, and wherein the cartridge includes downwardly-extending legs having retention rails secured thereto so that with the cartridge slid over the support shaft the retention rails protrude laterally inward below the slide blocks and above the lower surface of the support shaft to inhibit tipping of the cartridge by engagement of at least one of the retention rails with at least one of the slide blocks.

8. A belt cleaner assembly comprising:
an elongate support member for extending longitudinally across a conveyor belt;
a cartridge for supporting at least one scraper blade thereon, the cartridge slidable over the support member; and
slide blocks between the support member and the cartridge to space facing surfaces of the cartridge and the support member from each other,
wherein the support member comprises a support shaft having a generally square cross-sectional configuration with upper and lower surfaces extending between lateral side surfaces, and wherein the slide blocks include upper slide blocks secured to and spaced apart along the upper surface of the support member and side slide blocks secured to and spaced apart along the lateral side surfaces of the support member.

9. A belt cleaner assembly comprising:
an elongate support member for extending longitudinally across a conveyor belt;
a cartridge for supporting at least one scraper blade thereon, the cartridge slidable over the support member; and slide blocks between the support member and the cartridge to space facing surfaces of the cartridge and the support member from each other, wherein the slide blocks include first generally rectangular slide blocks having long axes orthogonal to a central axis of the support member, and second generally rectangular slide blocks having long axes parallel to the central axis of the support member.

10. A belt cleaner assembly comprising:

an elongate support member for extending longitudinally across a conveyor belt;

a cartridge for supporting at least one scraper blade thereon, the cartridge slidable over the support member; and slide blocks between the support member and the cartridge to space facing surfaces of the cartridge and the support member from each other, wherein the slide blocks are longitudinally spaced apart to define a longitudinal gap between adjacent slide blocks.

11. A belt cleaner assembly comprising:

an elongate support member for extending longitudinally across a conveyor belt;

a cartridge for supporting at least one scraper blade thereon, the cartridge slidable over the support member; and slide blocks between the support member and the cartridge to space facing surfaces of the cartridge and the support member from each other, wherein the support member includes a lateral side surface, and the slide blocks are secured to the lateral side surface of the support member to guide the cartridge during sliding of the cartridge relative to the support member.

12. A resilient mounting assembly for a belt cleaner for a conveyor belt, the resilient mounting assembly comprising:

a mounting plate for being fixed to a conveyor structure and having an opening to allow a support member to extend therethrough, the support member configured to allow belt cleaner blades of the belt cleaner to be mounted thereto;

a plurality of circumferentially spaced guide blocks having arcuate guide surfaces each having the same radius of curvature, the plurality of guide blocks secured to the mounting plate such that the arcuate guide surfaces have the same radial distance to a central axis of rotation; and a rotatable cradle plate mounted to extend between the guide blocks and having the support member and belt cleaner blades operatively secured thereto for rotation therewith, the cradle plate having an outer arcuate periphery with a radius of curvature corresponding to the radius of curvature of the arcuate guide surfaces such that rotation of the cradle plate about the central axis relative to the mounting plate is guided by the arcuate guide surfaces.

13. The resilient mounting assembly of claim 12 wherein each of the plurality of guide blocks has a block body that includes a groove, wherein the arcuate guide surface of each of the plurality of guide blocks is at a recessed bottom of the groove.

14. The resilient mounting assembly of claim 13 wherein each of the grooves has opposite open ends, and the rotatable cradle plate is retained by the guide blocks for rotation relative to the mounting plate with the outer arcuate periphery of the rotatable cradle plate received in the guide block grooves.

15. The resilient mounting assembly of claim 13 wherein each of the block bodies has opposite sidewalls on either side of the groove, the sidewalls having a varying depth along the groove.

16. The resilient mounting assembly of claim 12 wherein the guide blocks are secured to one side of the mounting plate so that the rotatable cradle plate is spaced from the one side of the mounting plate for rotation relative thereto.

17. The resilient mounting assembly of claim 12 wherein the rotatable cradle plate has a central notch, and a cradle bracket secured in the notch of the rotatable cradle plate for supporting the support member thereon so that the cradle plate, the cradle bracket, and the support member rotate about the central axis of rotation.

18. The resilient mounting assembly of claim 12 further comprising an actuator mounted to the mounting plate and configured to apply an actuation force to the support member so that the support member is caused to rotate by the cradle plate and guide blocks for resiliently adjusting tension of the belt cleaner blades against the conveyor belt.

19. A belt cleaner assembly comprising:

an elongate support member having longitudinally-extending side walls;

a cartridge for supporting at least one scraper blade thereon and being slidable along the support member;

a pair of depending legs of the cartridge that are spaced to receive the support member therebetween with each leg extending along a corresponding adjacent one of the side walls; and retention members fixed relative to the side walls of the support member so that each retention member is spaced from a corresponding adjacent one of the side walls to form a gap therebetween, wherein the gaps are sized to receive the legs of the cartridge between the support member and the retention members when the cartridge is slid to an operative position along the support member.

20. The belt cleaner assembly of claim 19 further comprising guide members secured to the side walls including guide members in the gaps such that the legs are guided by the guide members as the cartridge is slid along the support member and the legs fit between the guide members in the gaps and retention members as the cartridge reaches the operative position thereof.

21. The belt cleaner assembly of claim 19 wherein the retention members each comprise a vertical plate portion, and a spacer block portion at a bottom of the vertical plate portion that spaces the vertical plate portion from the side walls to form the gaps for the cartridge legs therebetween.

22. The belt cleaner assembly of claim 21 wherein the vertical plate portion is removably secured to the spacer block portion.

23. The belt cleaner assembly of claim 19 wherein the retention members are fixed to be disposed adjacent to a central portion of the support member, and the cartridge includes first and second cartridges each supporting at least one scraper blade thereon, distal longitudinal end portions of the legs of each of the first and second cartridges being received in the gaps between the support member and the retention members when the first and second cartridges are slid to their operative positions on the support member.

24. The belt cleaner assembly of claim 23 wherein the first and second cartridges have lateral projections at the distal end portions, and wherein the retention members include oppositely-facing slots for receiving the lateral projections when the distal longitudinal end portions are received in the gaps.

25. The belt cleaner assembly of claim 19 wherein the support member has an upper wall extending between the side walls, the cartridge has an upper web wall extending between the legs, the legs each have a bottom end, the side walls have a bottom end, and slide blocks spaced along the upper web wall of the support member for supporting the cartridge upper wall as the cartridge is slid on the support member with the bottom ends of the cartridge legs spaced above the bottom ends of the support member side walls.

* * * * *